R. J. PESCHMAN.
MELTING POT ATTACHMENT FOR BLOW TORCHES.
APPLICATION FILED MAY 12, 1916.
1,201,497.
Patented Oct. 17, 1916.
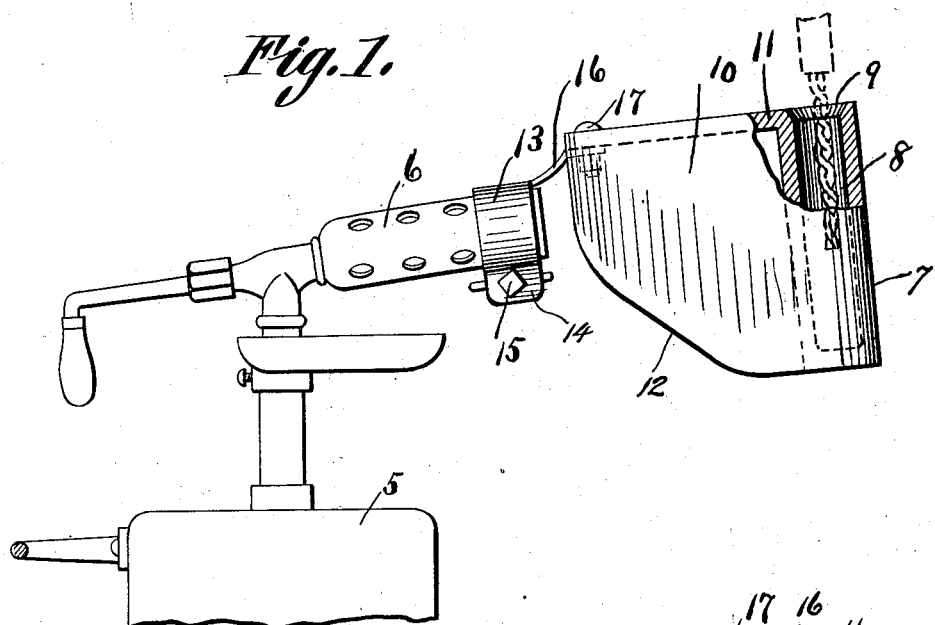
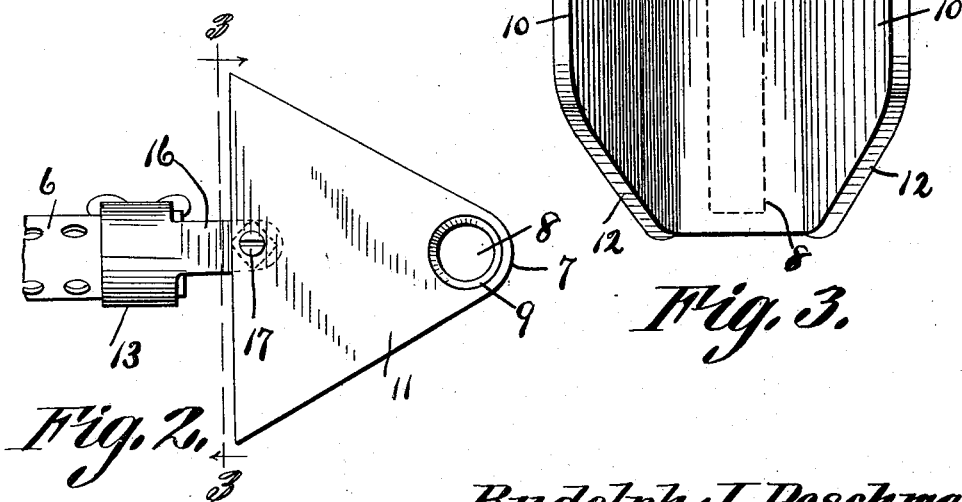
Rudolph J. Peschman
Inventor
Attorneys

UNITED STATES PATENT OFFICE.

RUDOLPH J. PESCHMAN, OF FORT SHERIDAN, ILLINOIS.

MELTING-POT ATTACHMENT FOR BLOW-TORCHES.

1,201,497.  Specification of Letters Patent.  Patented Oct. 17, 1916.

Application filed May 12, 1916. Serial No. 97,109.

*To all whom it may concern:*

Be it known that I, RUDOLPH J. PESCHMAN, citizen of the United States, residing at Fort Sheridan, in the county of Lake and State of Illinois, have invented new and useful Improvements in Melting-Pot Attachments for Blow-Torches, of which the following is a specification.

This invention relates to melting pots for solder and has as its object to provide a novel attachment for blow torches such as are used by plumbers, electricians and other workmen, which attachment will serve as a means whereby solder may be kept in a molten condition and in a manner convenient for use in soldering wires and other electrical connections.

In pursuing the ordinary methods of soldering wires and other electrical connections, the insulation of the connection or some adjacent object such as the nearby walls, ceiling or other support for the electrical connection is liable to be set afire.

The present invention therefore aims to provide an attachment of the class described so constructed that the two ends of the wires to be joined or the other parts constituting the electrical connection may be dipped into the molten solder to insure of their proper union, and without any likelihood of damage from fire.

In the accompanying drawing, Figure 1 is a side elevation of the device embodying the present invention, Fig. 2 is a top plan view thereof, Fig. 3 is a vertical sectional view on the line 3—3 of Fig. 2.

In the drawings, the numeral 5 indicates the ordinary plumber's blow torch and 6 the burner thereof, and the attachment embodying the present invention is designed to be connected to and supported by the said burner in a manner to be presently described.

The attachment comprises a body 7 provided with a melting chamber 8 which may be cylindrical as shown in the drawing or of any other desired shape, and which is open and slightly flared at the top as indicated by the numeral 9, the said chamber being designed to contain a sufficient quantity of solder for ordinary use. Extending rearwardly in diverging planes from the opposite sides of the body 7 are wings 10 which are connected at their upper edges by a web 11, the said wings and web being preferably integral with the body 7. The wings may have their lower rear corners cut away as indicated by the numeral 12 or they may be of substantially rectangular shape as viewed in side elevation. In any event, the said wings and the connecting web 11 form a heat concentrating chamber of which the rear side of the body 7 constitutes the forward wall, the wings 10 the sides, and the web 11 the top.

In order that the attachment above described may be connected to and supported by the burner 6 of the blow torch, a split collar 13 is fitted to the said burner and is provided with spaced ears 14 through which is run a bolt 15 having a wing nut thereon whereby the collar may be tightened about the said burner. An arm 16 extends forwardly from the collar 13 and is secured by means of a bolt or other suitable fastening means 17 to the web 11 at the rear edge thereof.

By reference to Figs. 1 and 2 of the drawings it will be apparent that the discharge end of the burner tube 6 is presented directly toward the interior of the heat concentrating chamber of the attachment and that therefore in the use of the device, the flame from the burner will impinge against the rear wall of the melting chamber 8, maintaining the solder therein in molten condition.

The device is particularly applicable to the work of soldering spliced ends of electrical wires. The bared wires to be joined are first scraped clean and then twisted together. The twisted ends can then be soldered by dipping the ends into the chamber 8 as shown dotted in Fig. 1.

I claim:

1. In an attachment of the class described, a body provided with a melting chamber, and a heat concentrating chamber located rearwardly of the said melting chamber and including sides extending from the said body and a top connecting the said sides and also extending from the said body, the rear wall of the melting chamber constituting the forward wall of the heat concentrating chamber, and means for attaching the device to a burner discharging into the heat concentrating chamber.

2. In an attachment of the class described, a body provided with a melting chamber, and a heat concentrating chamber located rearwardly of the said melting chamber and including sides extending rearwardly from opposite sides of the said body and a top connecting the upper edges of the said sides, and means carried by the said top for the attachment and support of the device.

In testimony whereof I affix my signature.

RUDOLPH J. PESCHMAN.

Copies of this patent may be obtained for five cents each, by addressing the "Commissioner of Patents, Washington, D. C."